US012007101B2

(12) United States Patent
Koch et al.

(10) Patent No.: US 12,007,101 B2
(45) Date of Patent: *Jun. 11, 2024

(54) LUMINAIRE WITH TOOL-LESS ASSEMBLY FEATURE

(71) Applicant: Extant Lighting, LLC, Huntington Beach, CA (US)

(72) Inventors: Steven Paul Koch, Westminster, CA (US); Arthur Lee Smith, Huntington Beach, CA (US)

(73) Assignee: EXTANT LIGHTING, LLC, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/833,931

(22) Filed: Jun. 7, 2022

(65) Prior Publication Data

US 2022/0299193 A1 Sep. 22, 2022

Related U.S. Application Data

(63) Continuation of application No. 17/342,787, filed on Jun. 9, 2021, now Pat. No. 11,378,262.

(Continued)

(51) Int. Cl.

*F21V 21/02* (2006.01)
*F21S 4/28* (2016.01)

(Continued)

(52) U.S. Cl.

CPC .............. *F21V 21/025* (2013.01); *F21S 4/28* (2016.01); *F21V 15/015* (2013.01); *F21Y 2103/10* (2016.08); *F21Y 2115/10* (2016.08)

(58) Field of Classification Search

CPC .... F21V 21/025; F21V 15/015; F21V 17/164; F21V 19/004; F21V 21/005; F21S 4/28; F21Y 2103/10; F21Y 2115/10

See application file for complete search history.

(56) References Cited

U.S. PATENT DOCUMENTS 10,852,466 B2 12/2020 Yeo
11,156,762 B2 10/2021 Yeo (Continued)

FOREIGN PATENT DOCUMENTS

WO 2021122844 6/2021

OTHER PUBLICATIONS

Xal Inc., "LENO Flat profile luminaire" product brochure, 2017.

(Continued)

*Primary Examiner* — Elmito Breval

(74) *Attorney, Agent, or Firm* — FisherBroyles LLP

(57) ABSTRACT

A luminaire with a tool-less assembly feature that enhances ease of installation and serviceability in the field. The luminaire's housing defines a compartment accessible via a window adjacent a pair of opposed shoulders. The luminaire further includes a lighting module dimensioned to be received and retained in the window in an interference fit with the shoulders. The lighting module may include an LED module/light guide plate and/or an LED refractor assembly/LED gear tray. A resilient member is supported on the housing in position to abut the lighting module and deflect during insertion of the lighting module through the window, and to at least partially resile to maintain the lighting module against the shoulders in an operative position on the housing. Further, the resilient member is positioned to deflect during removal and to resile to tilt or otherwise assist in ejecting the lighting module from the housing during tool-less disassembly.

39 Claims, 12 Drawing Sheets

Related U.S. Application Data

(60) Provisional application No. 63/038,745, filed on Jun. 12, 2020.

(51) Int. Cl.

| | |
|---|---|
| ***F21V 15/015*** | (2006.01) |
| *F21Y 103/10* | (2016.01) |
| *F21Y 115/10* | (2016.01) |

(56) References Cited

U.S. PATENT DOCUMENTS

| | | | |
|---|---|---|---|
| 11,163,104 | B2 | 11/2021 | Yeo |
| 11,333,822 | B2 | 5/2022 | Yeo |
| 11,520,097 | B2 | 12/2022 | Yeo |
| 11,543,582 | B2 | 1/2023 | Yeo |
| 11,592,609 | B2 | 2/2023 | Yeo |
| 11,592,610 | B2 | 2/2023 | Yeo |
| 11,598,912 | B2 | 3/2023 | Yeo |
| 11,630,255 | B2 | 4/2023 | Yeo |
| 11,635,179 | B2 | 4/2023 | Yeo |
| 11,635,564 | B2 | 4/2023 | Yeo |
| 2012/0182747 | A1 | 7/2012 | Doubek |
| 2019/0041570 | A1 | 2/2019 | Yeo |
| 2021/0405281 | A1 | 12/2021 | Yeo |
| 2022/0107454 | A1 | 4/2022 | Yeo |
| 2022/0137287 | A1 | 5/2022 | Yeo |
| 2022/0146063 | A1 | 5/2022 | Yeo |
| 2022/0171115 | A1 | 6/2022 | Yeo |
| 2022/0171119 | A1 | 6/2022 | Yeo |
| 2022/0206210 | A1 | 6/2022 | Yeo |
| 2022/0342141 | A1 | 10/2022 | Yeo |

OTHER PUBLICATIONS

Xal Inc., "Perfect Symmetry LENO," retrieved from <<https://www.xalusa.com/leno>>, retrieved from Oct. 22, 2023.

Xal Inc., "Woodworks Ceiling Integration PANO," retrieved from <<https://www.xalusa.com/pano>>, retrieved from Oct. 22, 2023.

Yu, Jyh-Cheng et al. "Design of Integrated Light Guiding Plates Using Silicon-based Micro-Features." The 10th International Conference on Automation Technology, Jun. 27-29, 2009, pp. 1-5.

LUMINAIRE WITH TOOL-LESS ASSEMBLY FEATURE

CROSS-REFERENCE TO RELATED APPLICATIONS

This application claims the benefit of priority, under 35 U.S.C. § 119(e), of U.S. Provisional Patent Application No. 63/038,745, filed Jun. 12, 2020, the entire disclosure of which is hereby incorporated herein by reference.

FIELD OF THE INVENTION

The present invention generally relates to electric lighting light fixtures, and more particularly to luminaires for architectural and other lighting purposes having LED light sources and a tool-less assembly feature.

BACKGROUND

Various electric lighting luminaires/lighting fixtures are well known in the art for use in architectural lighting and other lighting applications. Such luminaires may have many different structures and use different types of light sources, and may be configured for direct and/or indirect lighting, with light sources emitting upwardly and/or downwardly, etc. One exemplary construction makes use of LED light sources. Luminaires having such constructions often employ an LED gear tray, which typically includes LEDs, a driver and/or other components of an electrical system, sometimes arranged and supported on generally flat, e.g., printed circuit board, module. Often, such luminaires employ a light guide plate, which is typically generally planar and includes one or more light extraction features to extract from the LEDs and direct and/or distribute light in the intended direction, and further may include a diffuser to disperse light to provide a more uniform distribution of light over an illuminated area than an array of LEDs would otherwise provide.

Accordingly, such luminaires are made up of numerous electrical and structural components. These components are typically assembled during initial manufacture, in which the components are permanently or semi-permanently fixed together with tool-driven fasteners, etc. Accordingly, such luminaires are generally not designed for easy manufacture. Further, such fixtures and fasteners are cumbersome to disassemble, even with appropriate tools, and are generally not designed for subsequently disassembly and service in the field, e.g., to provide for easy access to the wiring compartment and/or serviceable/replaceable electrical components, after initial manufacture. Some fixtures, and particularly edge lit fixtures, are designed for serviceability despite the use of fasteners but must, as a practical matter, be removed from service in the field and returned to a service facility, with appropriate tools, to service the fixture, which is undesirable.

What is needed is a luminaire providing for tool-less manufacture of certain components according to a design that allows for easy and tool-less disassembly and reassembly in the field, to provide for easy access to the wiring compartment and/or serviceable/replaceable electrical components of the luminaire in a tool-less fashion.

SUMMARY

The present invention provides a luminaire having a tool-less assembly feature. The luminaire provides for tool-less manufacture according to a design that also allows for easy disassembly and reassembly in the field, which facilitates easy access to the wiring compartment and/or serviceable/replaceable electrical components of the luminaire in the field. An exemplary luminaire includes a housing defining a compartment accessible via a window defined by the housing. The housing further defines a pair of opposed shoulders adjacent the window. The luminaire further includes a lighting module dimensioned to be received and retained in the window in an interference fit with the shoulders. The lighting module includes a light source. A resilient member is supported on the housing. The resilient member is positioned to abut the lighting module and be deflected by contact therewith during insertion of the lighting module through the window, and to at least partially resile to maintain the lighting module against the shoulders in an operative position on the housing. The resilient member may also serve to tilt or otherwise assist in removal of the lighting module from the housing during disassembly.

BRIEF DESCRIPTION OF THE DRAWINGS

An understanding of the following description will be facilitated by reference to the attached drawings, in which.

DETAILED DESCRIPTION

Figure 1:
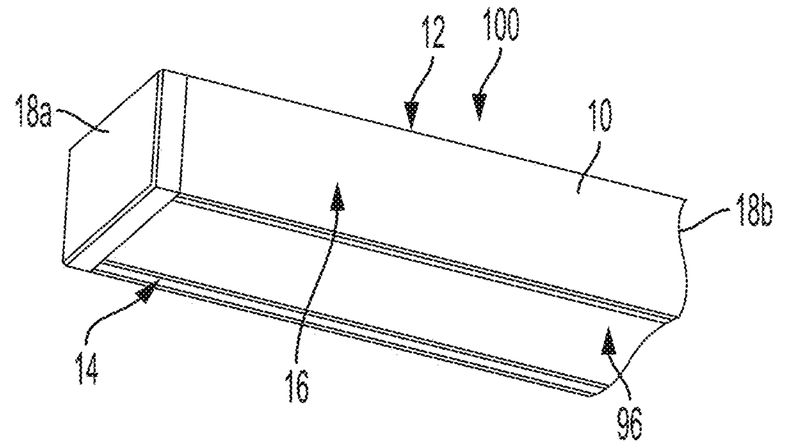
FIG. 1 is a perspective view of an exemplary luminaire in accordance with a first exemplary embodiment of the present invention, shown in the fully-assembled state.
Figure 2:
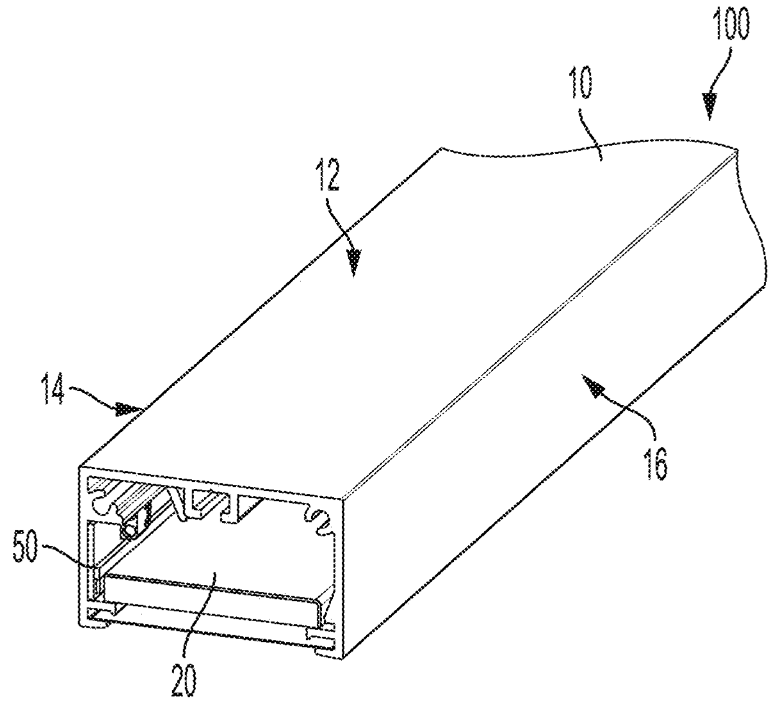
FIG. 2 is a perspective view of the luminaire of FIG. 1, shown with the end caps removed for illustrative clarity.
Figure 3:
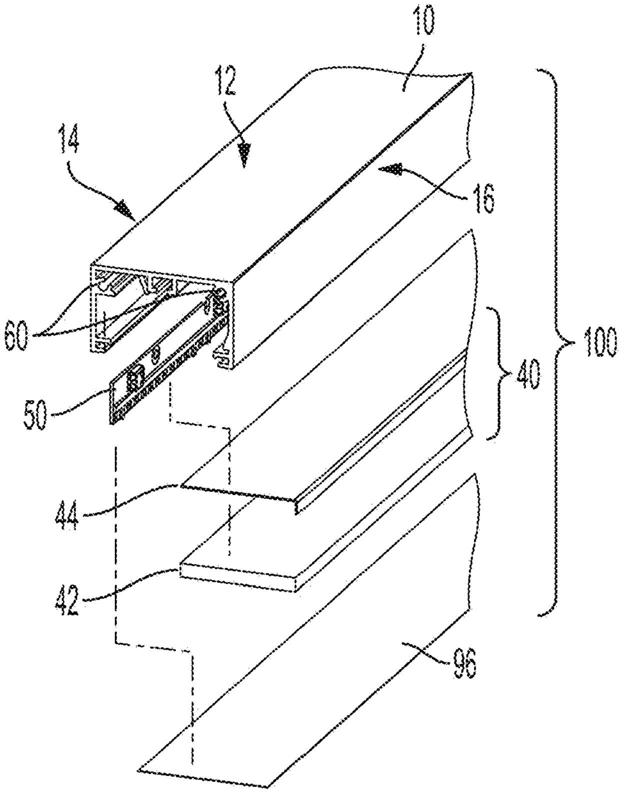
FIG. 3 is an exploded perspective view of the luminaire shown in FIG. 2.
Figure 4:
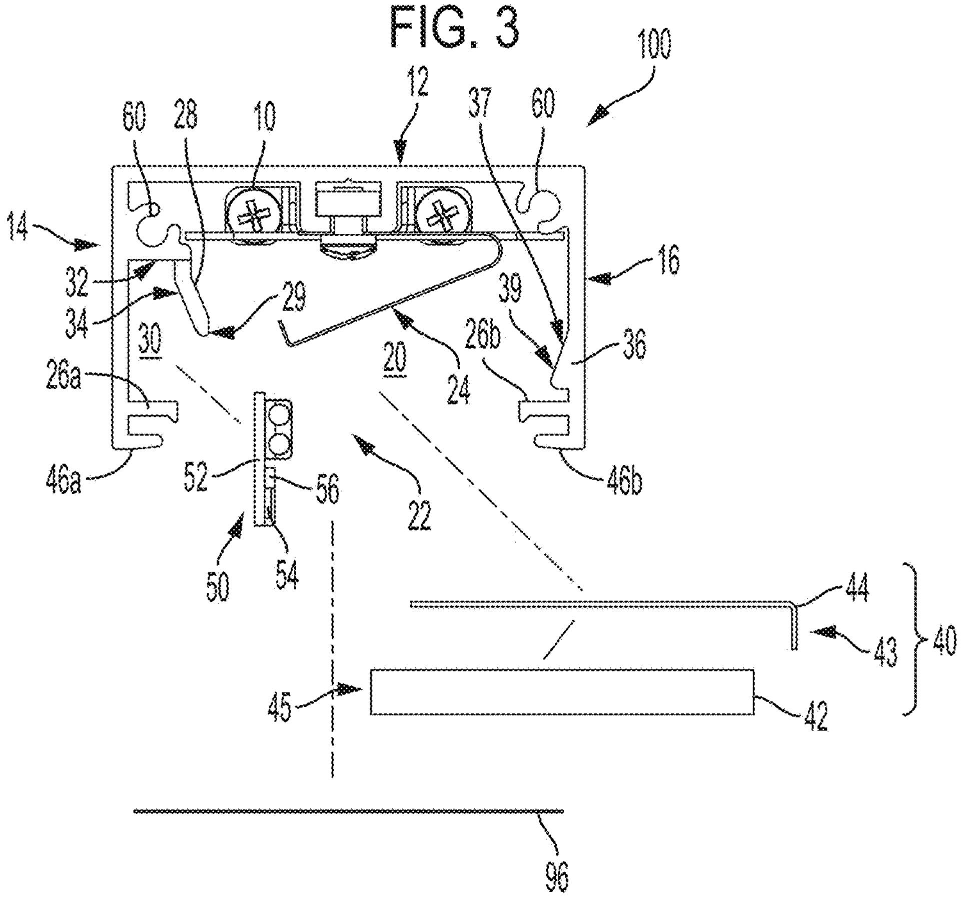
FIG. 4 is an exploded end view of the luminaire shown in FIG. 2.

FIGS. 1-7C show a luminaire 100 in accordance with an exemplary embodiment of the present invention. In this exemplary embodiment, the luminaire 100 has an overall shape of an elongated box, and includes an elongated housing 10 defining a first (e.g., upper) wall 12 and two opposed side walls 14, 16. The exemplary housing 10 is therefore generally U-shaped, as best shown in FIG. 4. As best shown in FIG. 1, the luminaire further includes two end caps 18*a*, 18*b*. These components cooperate to define a compartment 20 therebetween, which is used to house wiring and/or operative components of the luminaire, as discussed below. Further, the housing 10 defines a window 22 between the side walls 14, 16. The luminaire may have any desired shape, size and configuration, as will be appreciated by those skilled in the art. By way of example, the exemplary luminaire may have a length in the range of about 6" to about 8' for discrete stand alone fixtures or an unlimited length for a continuous row fixture made by interconnecting individual fixtures end to end, a width in the range of about 1.875" to about 8" and a height in the range of about 1.125" to about 8".

Generally, the luminaire's components may comprise an LED module, an LED driver, a light guide plate, a reflector and a diffuser. Generally, the operative components of the luminaire include a light source and light distribution components operative to emit light via the window 22. In accordance with the present invention, the luminaire has a tool-less assembly feature that facilitates easy access to the internal/wiring compartment 20 and/or serviceable/replaceable operative components of the luminaire by way of components joined in an interference fit, free of mechanical and non-mechanical fasteners. Notably, the luminaire also allows for easy disassembly and reassembly in the field.

The tool-less assembly feature is implemented by one or more structures on the housing 10 that provide for assembly of components in an interference fit, free of mechanical and non-mechanical fasteners. For example, the exemplary embodiment of FIGS. 1-8C, includes a resilient member 24 supported on the housing 10. Further, the housing 10 defines a pair of shoulders 26*a*, 26*b* extending inwardly from the side walls 14, 16, as best shown in FIG. 4. These shoulders 26*a*, 26*b* act as a stop and cooperate with the resilient member 24 to retain a lighting module in an operative position after assembly to the housing 10. The resilient member 24 functions to keep tension on luminaire components when installed, and aids in ejecting components during disassembly and removal, as discussed below, as discussed in greater detail below. Notably, the lighting module may be assembled to the housing in a tool-free assembly process, and may be retained on the housing without mechanical or non-mechanical fasteners, to allow for easy disassembly and reassembly in the field, as discussed below.

By way of further example, the exemplary embodiment of FIGS. 1-7C, the housing further defines a stop 28. The stop 28 extends from the housing 10 into the compartment 20, and defines a stop surface 29 positioned within the compartment to abut the lighting module, during assembly, and to thereby act as a stop to brace the lighting module during its assembly to the housing 10, as best show in FIG. 4, and as discussed in greater detail below.

In the exemplary embodiment of FIGS. 1-7C, the stop 28 further defines a secondary compartment 30 that is at least partially enclosed by the stop 28. In the exemplary embodiment of FIGS. 1-7C, the stop defines a first surface 32 for abutting and/or constraining a lighting module in a first (e.g., vertical) direction, and a second surface 34 for abutting and/or constraining a light source module or other operative component, if desired, as best shown in FIGS. 2-4.

In the exemplary embodiment of FIGS. 1-8C, the stop 28 further defines a secondary compartment 30 that is at least partially enclosed by the stop 28. In the exemplary embodiment of FIGS. 1-8C, the stop defines a first surface 32 for abutting and/or constraining a lighting module in a first (e.g., vertical) direction, and a second surface 34 for abutting and/or constraining a light source module or other operative component, if desired, as best shown in FIGS. 2-4.

In the exemplary embodiment of FIGS. 1-8C, housing 10 further defines a guide rib 36 on side wall 16. The exemplary guide rib 36 defines a cam surface 37 positioned to cooperate with the resilient member 24 to displace/direct the lighting module laterally, away from side wall 16, to help move the lighting module into its operative position within the window during assembly to the housing. Further, the exemplary guide rib 36 defines a retention surface 39 positioned to engage a side portion of the lighting module while it is in the operative position within the window, to help to retain the lighting module on the housing 10 in a stable and secure fashion, e.g., in a friction fit by wedging the lighting module toward the opposing side wall 14.

In accordance with the present invention, such a housing and components thus described may be mated to different types of lighting modules to form operative luminaires. In certain embodiments, the lighting module is a light guide assembly 40-type lighting module. In other embodiments, the lighting module is a refractor module 70, which may be mated to the housing in a similar manner in lieu of the light guide assembly 40/LED module 50, as discussed in greater detail below.

Additionally, in the exemplary embodiment of FIGS. 1-8C, the housing further defines a second pair of shoulders 46*a*, 46*b* extending inwardly from the side walls 14, 16, as best shown in FIG. 4. These shoulders 46*a*, 46*b* act to retain a diffuser panel in an operative position after assembly to the housing 10. Notably, the diffuser panel 96 may be assembled to the housing in a tool-free assembly process, and may be retained on the housing without mechanical or non-mechanical fasteners, to allow for easy disassembly and reassembly in the field, as discussed below.

Figure 5A:
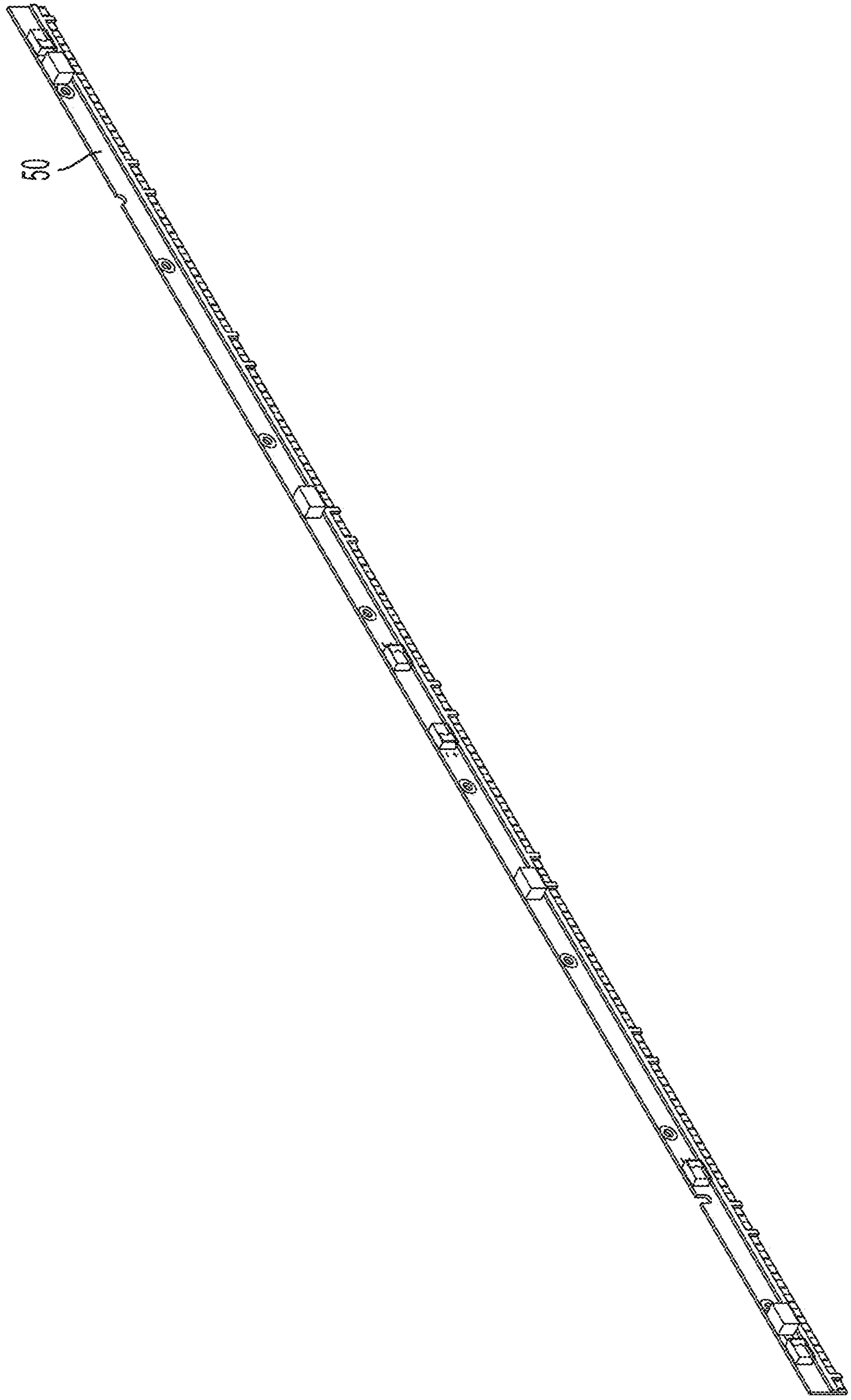
FIGS. 5A and 5B are perspective and exploded perspective views of light source module of the luminaire of FIG. 1.
Figure 5B:
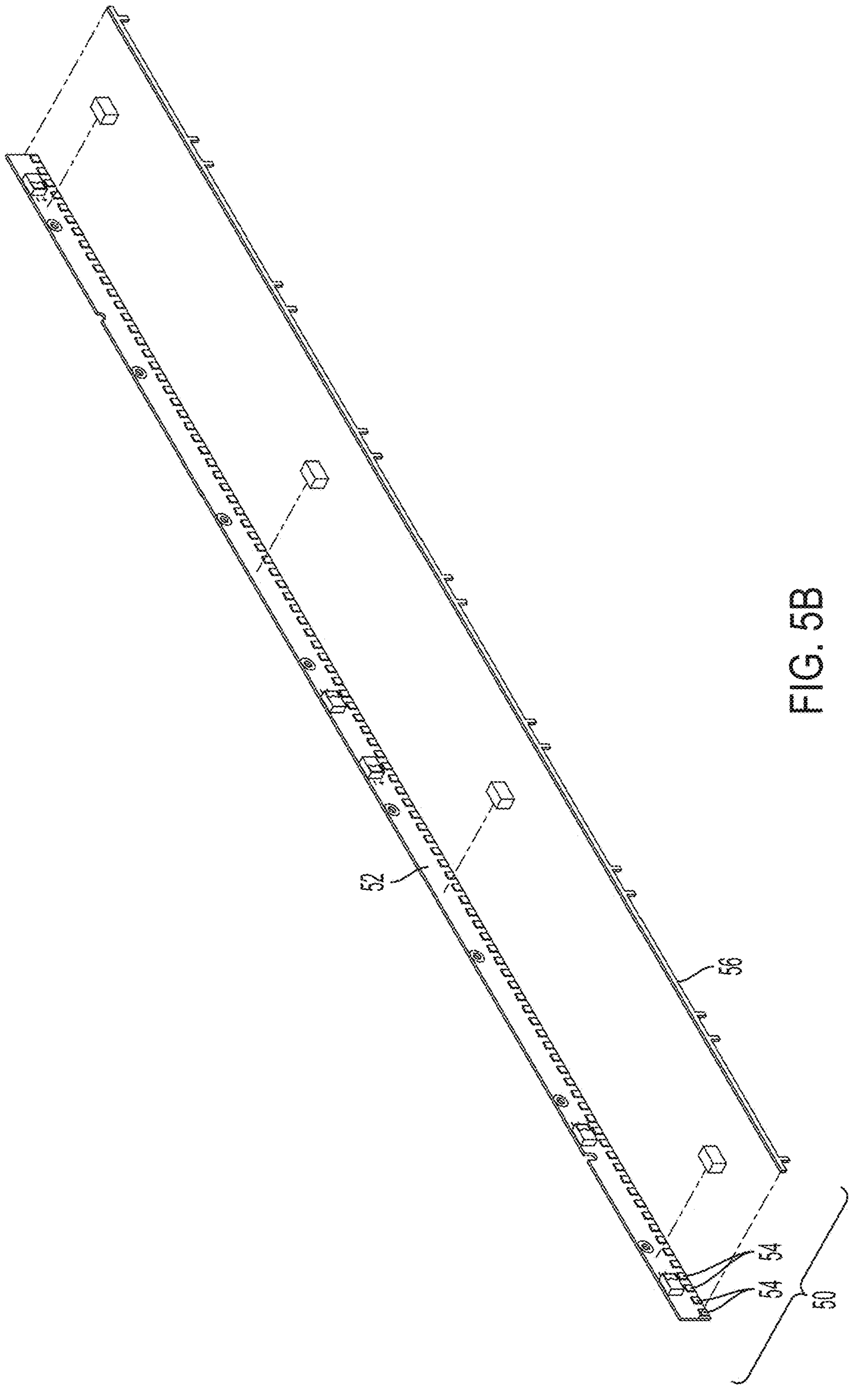

The exemplary luminaire 100 of FIGS. 1-8C can be assembled in tool-free fashion as follows, e.g., before or after mounting the housing 10 in a desired location is a building, etc. First, a light source module 50 is inserted into the second compartment 30. The light source module 50 may, for example, include a printed circuit board substrate 52 supporting electrically interconnected LEDs 54 arranged in a linear array positioned to emit light into the light guide assembly in an edge-lit configuration, and optionally a physical buffer 56, e.g. for protecting the LEDs from damage during shipping, etc. and provided clearance between the LEDs and light guide assembly 40, etc., and foam supports 58, which compress against the light guide assembly 40 during assembly to help to securely seat the light source module 50 against the light guide assembly 40, as best shown in FIGS. 5A and 5B. Notably, the light source module 50 may be inserted manually into the second compartment 30 until its top surface abuts the first and second surfaces 32, 34 of the stop 28, and the corresponding shoulder 26*a*, as will be best appreciated from FIGS. 4 and 5. The light source module 50 is thereby supported by the housing, within the compartment 20 of the housing, at least temporarily, without the need for mechanical and/or non-mechanical fasteners, or tools.

Figure 6A:
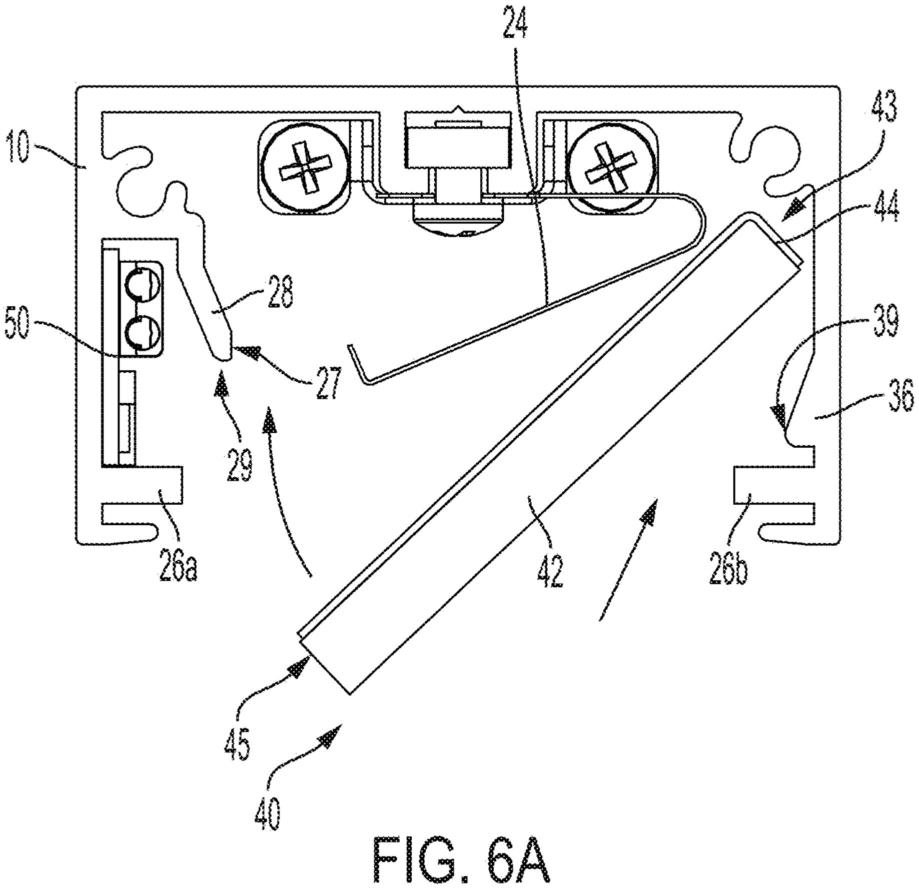
FIGS. 6A and 6B are end views of the luminaire of FIG. 1, showing assembly of the LED module and light guide assembly to the luminaire housing.
Figure 6B:
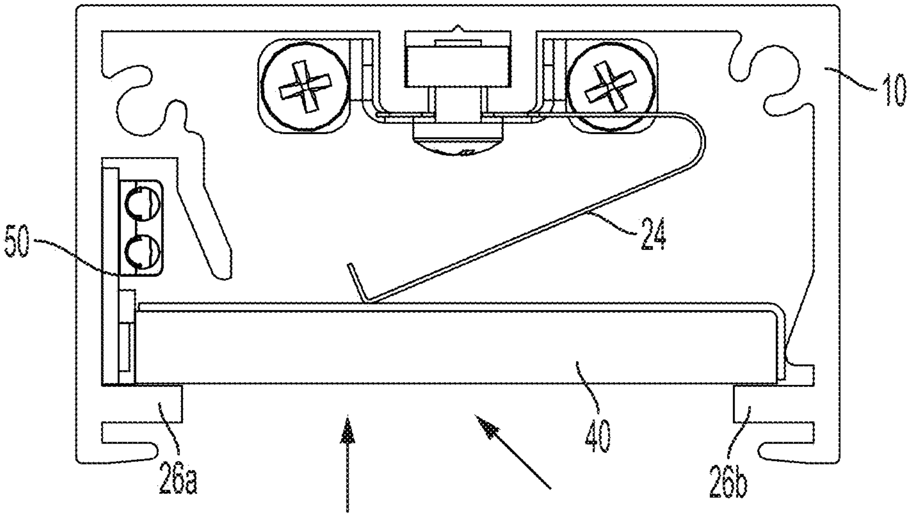

Next, the light guide assembly 40 may be inserted and assembled to the housing 10 in tool-free fashion, as best shown in FIGS. 6A and 6B. The light guide assembly 40 may include a light guide plate 42, which may include structures for redirecting outwardly light emitted from the LEDs transversely, and may further include a complementary reflector plate 44 dimensioned to overlie the light guide plate 40. The reflector plate acts to reflect light outwardly from the luminaire, and also functions as part of the luminaire enclosure. Notably, the reflector plate 44 may be simply stacked with the light guide plate 42, without mechanical or non-mechanical fasteners. More particularly, a first longitudinal edge 43 of the light guide assembly 40 may be inserted, e.g., at approximately a 45-degree angle, into the compartment 20, e.g., adjacent the resilient member 24, as shown in FIG. 6A.

Next, the light guide assembly 40 may be pushed/pivoted to cause the second longitudinally edge 45 to enter the compartment 20. Doing so causes the light guide assembly 40 to abut and deflect the resilient member 24 until the light guide assembly abuts the surface 29 of the stop 28. The stop surface 29 stops the light guide assembly in a position aligning the second longitudinal edge 45 of the light guide assembly 40 for movement into a position abutting the first shoulder 26*a*, as will be appreciated from FIGS. 6A and 6B. As the light guide assembly 40 is manipulated to move the second longitudinal edge 45 into adjacent and/or abutting relationship with the LEDs of the LED module 50, the resiling resilient member 24 and cam surface 37 of the guide rib 36 urge the light guide assembly into its operative position in the window 22. In this embodiment, the resilient member 24 and retention surface 39 of the guide rib 36 urge the light guide assembly 40 into abutting relationship with the light source module 50, and serve to retain the light guide assembly 40 in the window in a friction fit, and trapped between the partially-resiled resilient member 24 and the shoulders 26*a*, 26*b*, as shown in FIG. 6B. The light guide assembly 40 is thereby supported on the housing, within the window 22, without the need for mechanical and/or non-mechanical fasteners, or tools.

Figure 7A:
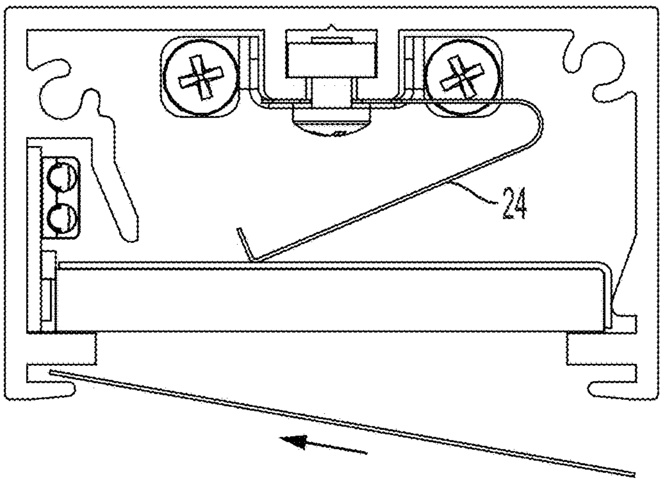
FIGS. 7A-7C are end views of the luminaire of FIG. 1 showing assembly of a diffuser to the luminaire housing.
Figure 7B:
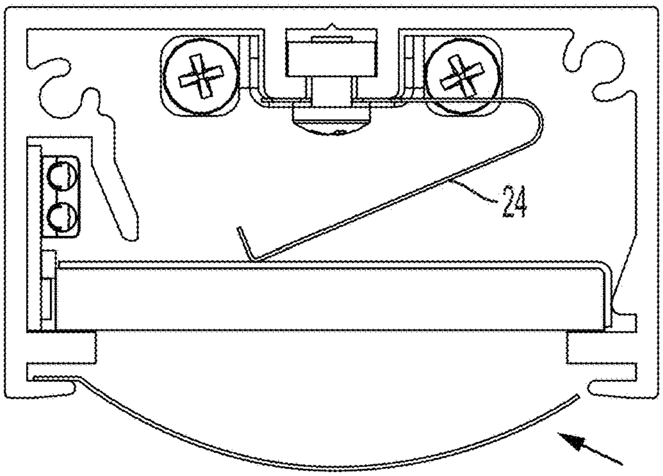
Figure 7C:
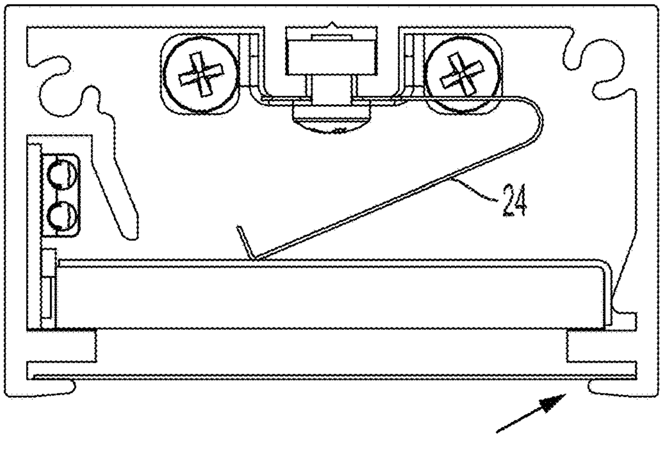
Figure 8A:
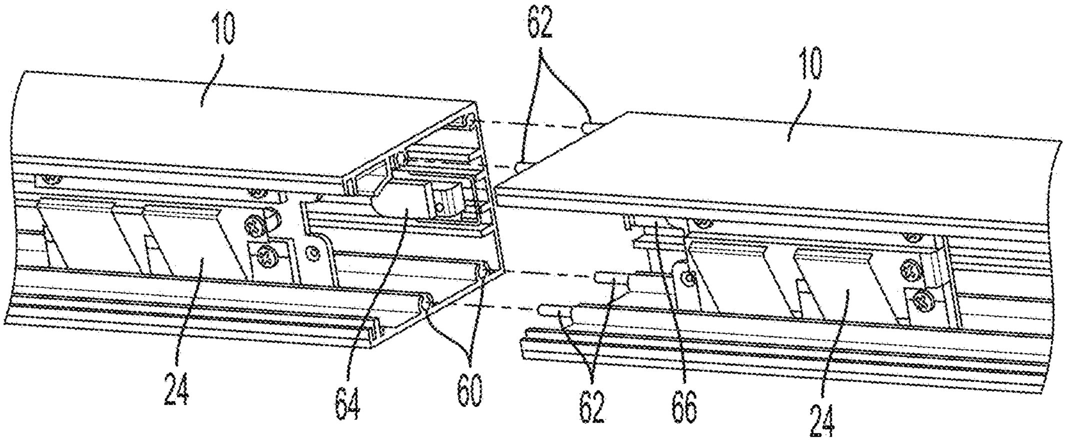
FIGS. 8A-8C are perspective views of a continuous row luminaire comprised of multiple housings of the luminaire of FIG. 1.
Figure 8B:
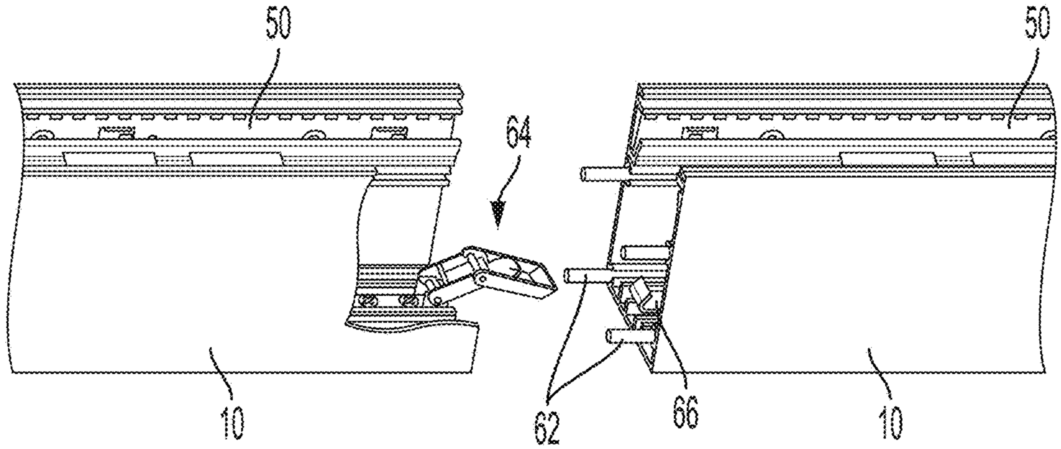
Figure 8C:
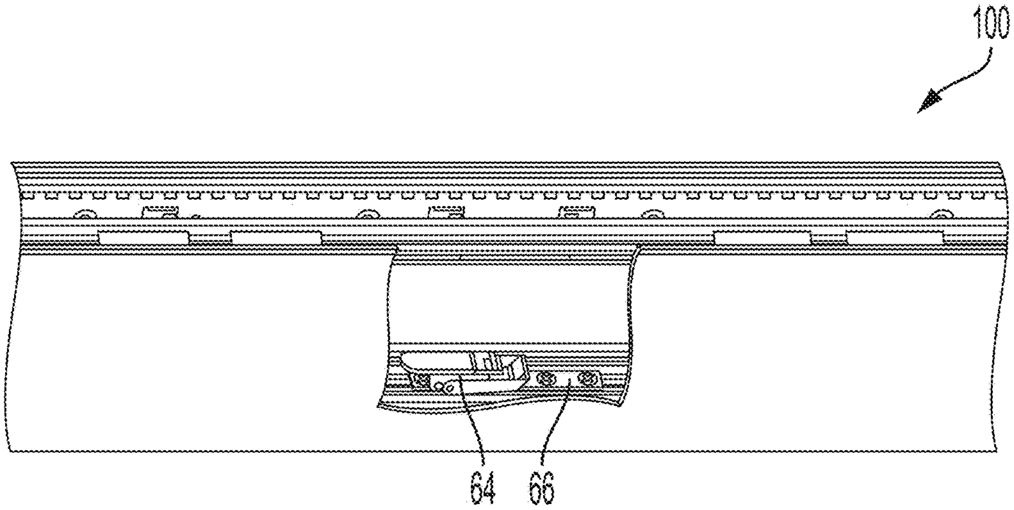

Next, for the exemplary luminaire, the diffuser plate 96, which may be supplied in roll form, is assembled to the housing in tool-free fashion, as shown in FIGS. 7A-7C. More particularly, a first edge 98*a* of the diffuser plate 96 may be positioned above/internally of the second shoulder 46*a* on the first wall 14, as shown in FIG. 7A. Next, the second edge 98*a* of the diffuser plate 96 is positioned above/internally of the second shoulder 46*b* on the second wall 16 by bending the diffuser plate 96 as shown in FIG. 7B until the second end 98*b* of the diffuser plate 96 clears the second shoulder 46, and then allowing the diffuser plate 96 to resile, at which point the shoulders 46*a*, 46*b* act to retain the diffuser panel 96 in an operative position, as shown in FIG. 7C. Accordingly, the diffuser panel 96 may be assembled to the housing in a tool-free assembly process, and may be retained on the housing without mechanical or non-mechanical fasteners.

As referred to above, the exemplary luminaire may have a length in the range of about 6" to about 8' for discrete stand alone fixtures (described above). Alternatively, two or more housings may be joined together end-to-end to provide a continuous fixture of any desired length. In support of this continuous row fixture functionality, the exemplary housing 10 defines at least one opening 60 on an end of the housing, preferably defined between spaced fingers capable of deflecting and resiling to receive and retain a connector pin 62, which can be inserted partially into an opening 60 on a first housing, and partially into a second opening on a second housing to align and interconnect the fixtures, as will be appreciated from FIGS. 3, 4, 8A and 8B. Alternatively, connector guides riding on ribs on the housings may be used in substitution for the connector pins and openings. Additionally, one end of each housing may be configured with first connector 64, such as a bail latch, draw latch, toggle clamp or the like, and the second end or each housing may be configured with a second connector 66, such as a catch, complementary to the first connector 64, as will be appreciated from FIGS. 8A-8C. This allows for mating of one or more housings in modular fashion to provide a continuous row fixture in a desired length, by allow for mechanical interconnection and interlocking of the first end of one housing to the second end of a second housing. Preferably such connectors allow for mechanical interconnection to in a tool-free fashion. In may be desirable to join the housings together in a continuous row fixture prior to assembling the light guide assemblies and diffuser panels, etc. as described above.

Figure 9A:
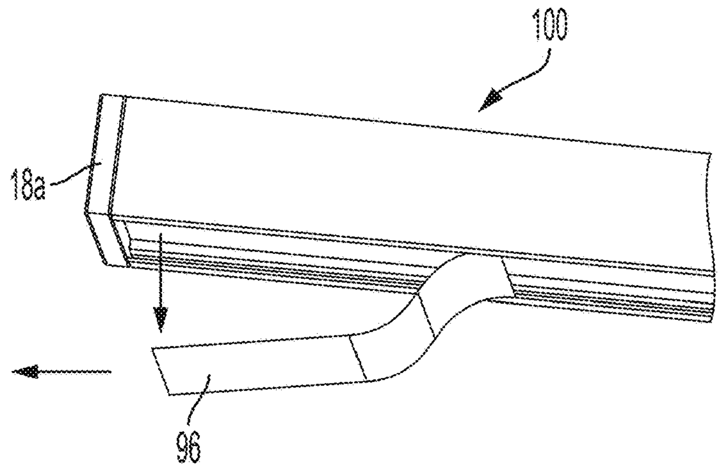
FIGS. 9A-9C are perspective and end views of the luminaire of FIG. 1, showing disassembly of the diffuser and light guide assembly from the luminaire housing.

In the event of luminaire component failure or for other reasons, the luminaire subsequently may be easily disassembled in the field, such that the compartments 20, 30 may be easily accessed, wiring and/or components may be easily serviced and/or replaced, and the luminaire may be reassembled, in the field. For example, the diffuser plate 96 may first be removed, e.g., by pinching/bending and/or prying the diffuser plate to free it from behind the second shoulders 46*a*, 46*b*, as shown in FIG. 9A. Notably, no mechanical or non-mechanical fasteners need to be removed or disrupted.

Figure 9B:
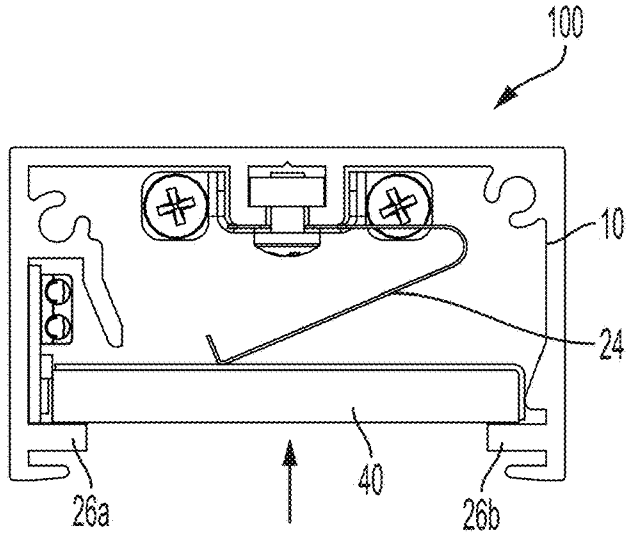
Figure 9C:
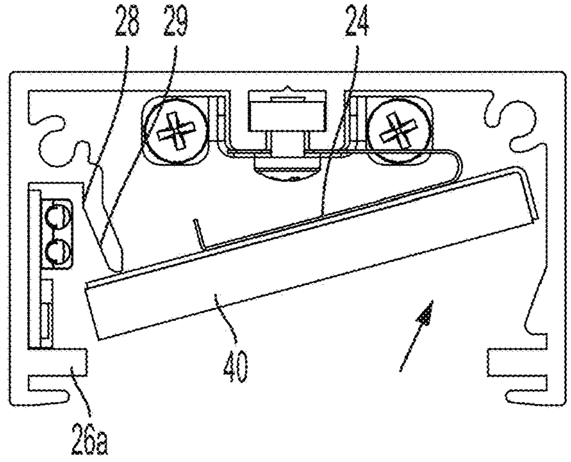

Next, the light guide assembly 40 may be removed by manually pressing upwardly/inwardly on the light guide assembly 40, to cause the light guide assembly 40 to leave its position abutting the first shoulders 26*a*, 26*b*, and causing deflection/compression of the resilient member 24, as shown in FIG. 9B. Inward travel of the light guide assembly 40 may be stopped with the top surface of the light guide assembly abuts the stop surface 29 of the stop 28, as shown in FIG. 9C.

In certain embodiments, including that shown in FIGS. 1-7C, the resilient member may be formed to have an arm extending at an acute angle to a horizontal plane/top surface 12 of the housing 10 and/or plane of the lighting module when in the operative position. In certain embodiments, the resilient member may be formed to have two legs separated by an acute angle, such that one leg may be anchored to the housing and the other leg may extend freely to be deflected and to resile, as shown in FIGS. 2-7C. This may facilitate tilting of the light guide assembly 40 toward a position in which the first longitudinal edge 43 is deep within the housing 10 and the second longitudinal edge 45 is urged by the resiling resilient member toward position to clear the shoulder 26*a* on the wall 14, as shown in FIG. 7C, to effectively “eject” the light guide assembly 40 from the housing 10. The light guide assembly 40 may be manually manipulated to cause the second longitudinal edge 45 to clear the shoulder 26*a* and entire light guide assembly 40 may then be removed from the housing, to provide access to the compartment 20. Notably, no mechanical or non-mechanical fasteners need to be removed or disrupted. Accordingly, embodiments of the present invention provide a luminaire with a push-to-eject tool-free assembly feature.

Internal components of the luminaire accessible in the compartment 20 may then be serviced and/or replaced, and the luminaire may be reassembled in corresponding fashion.

The embodiment of FIGS. 1-7C is provided for illustrative and non-limiting purposes only. In the example discussed above, a light guide assembly 40 is assembled to the housing to provide a complete luminaire. The exemplary luminaire of FIGS. 1-7C emits light in one direction, e.g., downwardly with reference to FIGS. 1-7C. It should be noted that this luminaire may be mounted to emit light downwardly, upwardly, or in another direction. For the sake of non-limiting illustrate example, and for ease of reference to the figures, it is described for the sake of this illustrative discussion that the embodiment of FIGS. 1-7C emits light downwardly.

Figure 10:
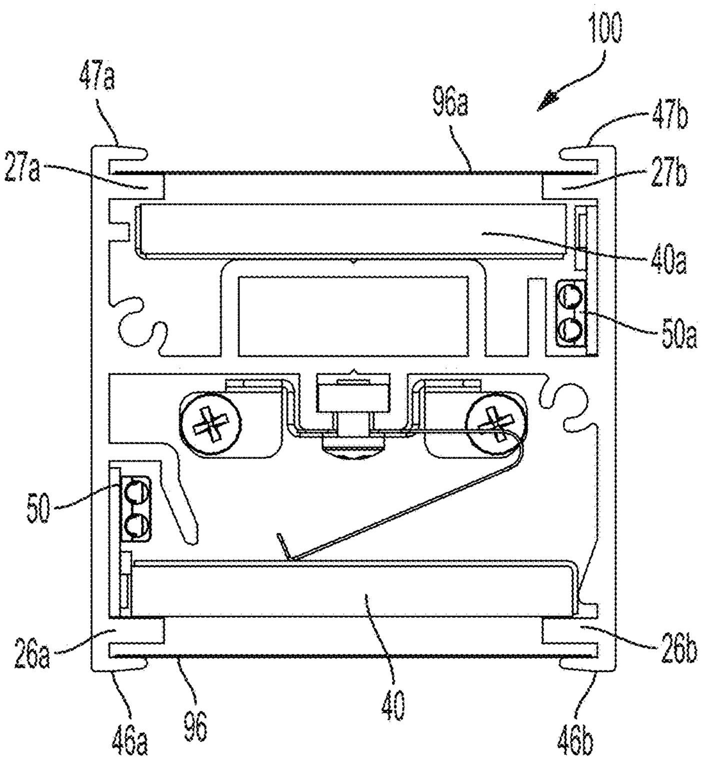
FIG. 10 is an end view of an exemplary luminaire in accordance with a second exemplary embodiment of the present invention.

By way of alternative example, FIG. 10 is an end view of a similar luminaire 100 that is configured to emit light both downwardly and upwardly. More particularly, the housing 10 is expanded to include a second instance of certain structures present in FIGS. 1-7C and/or additional structures. In this illustrative example, a second light guide plate 40*a*, second lighting module 50*a*, and second diffuser plate 96*a* held by corresponding shoulders 27*a*, 27*b*, 47*a*, 47*b* in addition to the structures described with reference to FIGS. 1-7C. In this second exemplary embodiment of the present invention, an additional resilient member is omitted, and the second light guide plate 40*a* and second lighting module 50*a* are assembled by removing an end cap and sliding the components into the corresponding compartments 20, 30 in sideways/horizontal fashion, as will be appreciated from FIG. 10.

In the embodiments of FIGS. 1-7C and FIG. 10, the operative components may further include an LED driver, which may be physically located remotely from (outside of) the housing 10, luminaire 100 (e.g., positioned in a separate housing and installed away from the luminaire, in a "remote driver" configuration), or may be provided internally to and/or on the housing 10 of the luminaire housing, in an "integral driver" configuration.

Figure 11:
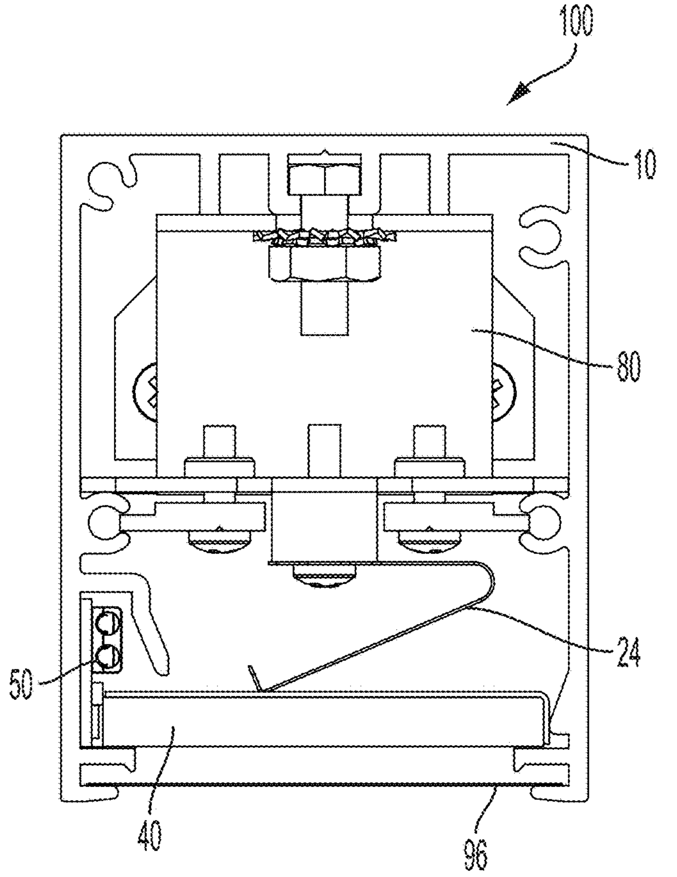
FIG. 11 is an end view of an exemplary luminaire in accordance with a third exemplary embodiment of the present invention.
Figure 12:
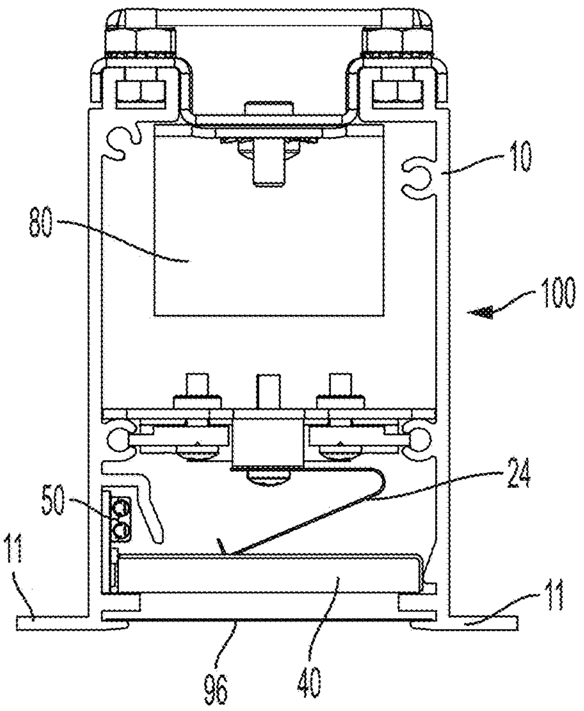
FIG. 12 is an end view of an exemplary luminaire in accordance with a fourth exemplary embodiment of the present invention.
Figure 13:
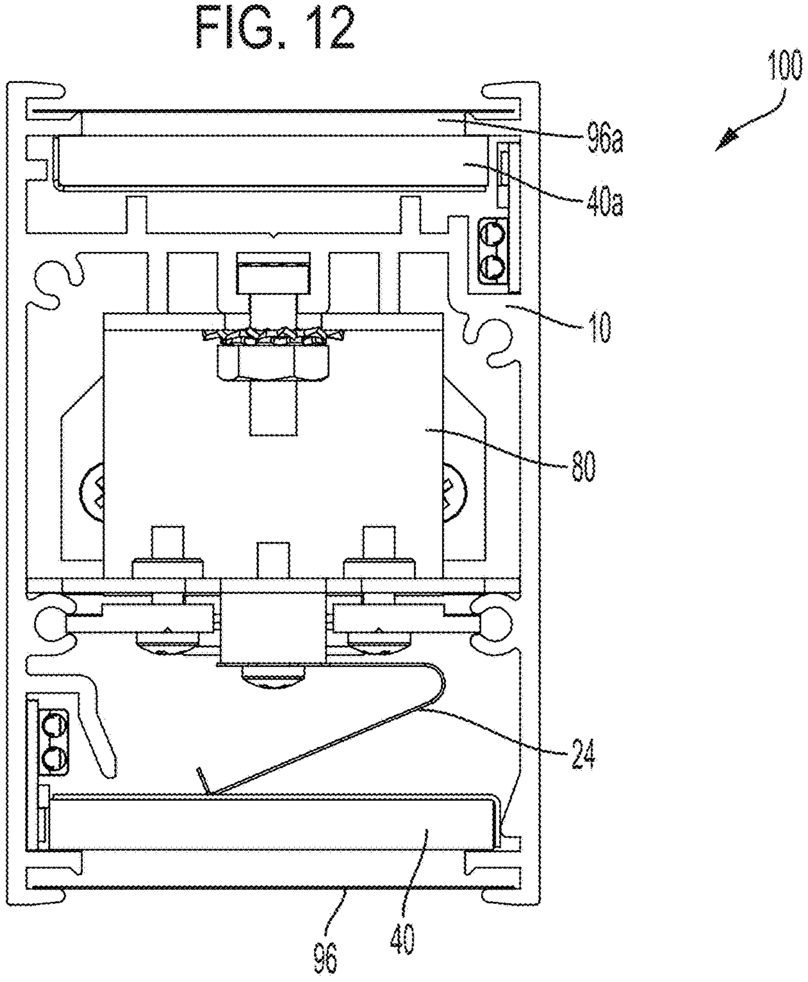
FIG. 13 is an end view of an exemplary luminaire in accordance with a fifth exemplary embodiment of the present invention.

By way of additional alternative example, FIG. 11 is an end view of another exemplary luminaire in accordance with a third exemplary embodiment of the present invention. This embodiment is similar to that of FIGS. 1-7C, but the housing 10 is expanded to house the LED drive 80 internally to the housing 10. FIG. 12 is an end view of yet another exemplary luminaire, which is somewhat similar to that of FIG. 11, but in this instance, the housing 10 is further configured to include a transverse flange 11 making the luminaire 100 suitable for installing in an opening, e.g., of a ceiling, as a recessed lighting fixture. By way of further alternative example, FIG. 13 shows yet another exemplary luminaire. This luminaire is somewhat similar to that of FIG. 10, but it includes an expanded housing similar to that of FIG. 11 that houses an integral drive internally thereto. It will be appreciated by those of skill in the art that the present invention may be implement in any suitable luminaire configuration.

In the exemplary embodiments discussed above with reference to FIGS. 1-13, a lighting module comprising a light guide assembly 40 and lighting module 50 are assembled to the housing to provide a complete luminaire. By way of alternative example, FIGS. 14A-15B illustrate the use of a lighting module comprising an exemplary refractor module 70, or "LED optic gear tray," as an alternative to the lighting guide assembly/lighting module combination. The refractor module 70 includes a refractor housing 72 supporting LEDs 74, e.g., in a linear array, on a substrate the housing 72. The refractor housing 72 further includes refractor element 76 that may include prisms or other structures, or coatings, for distributing light emitted from the individual LEDs. The refractor housing 72 may define structures 77 matable with complementary structures 79 of the refractor element 76 for releasably mating the refractor element 76 to the refractor housing 72 in an interference fit, as will be appreciated from FIG. 14A. The refractor module may be mounted to the housing is a fixed or releasable fashion, e.g., to a mounting boss 13 defined on the housing 10, to provide up lighting as shown in FIG. 14B. Doing so obviates the need for the light guide assembly, lighting module and diffuser to provide up lighting, as shown in FIG. 143, and thus the exemplary luminaire 100 may be used as an alternative to the embodiment shown in FIG. 10.

Figure 14A:
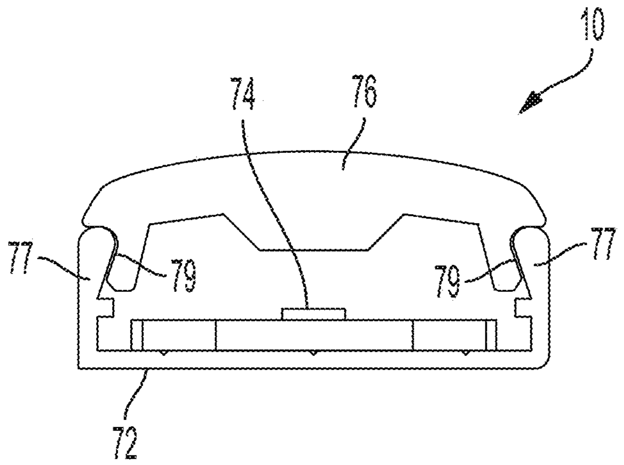
FIG. 14A is an end view of an exemplary refractor module for use in a luminaire.
Figure 14B:
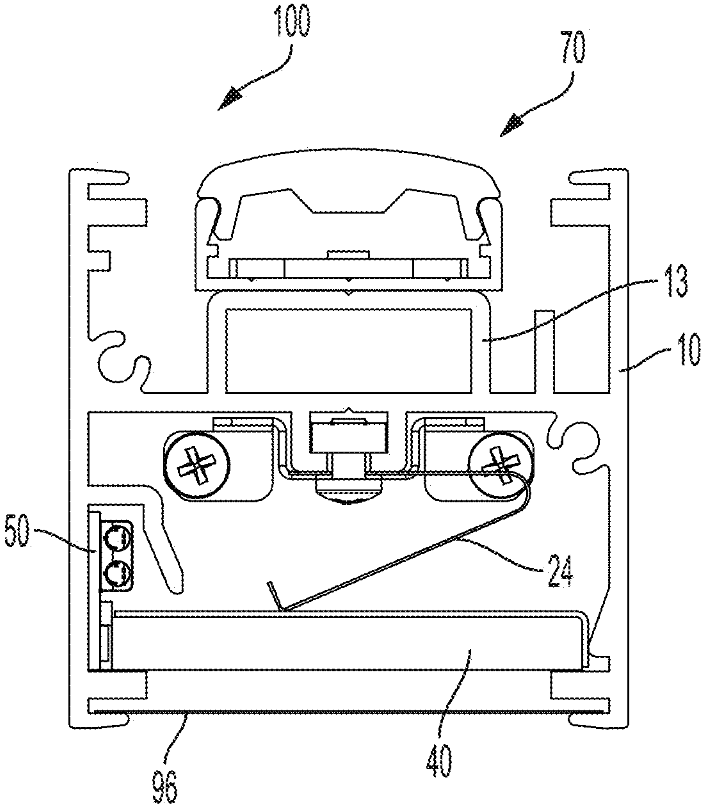
FIG. 14B is an end view of an exemplary luminaire in accordance with a sixth exemplary embodiment of the present invention; including an LED module and light guide module for providing downlighting, and a refractor module for providing up lighting.

Further, the refractor module 70 shown in FIG. 14A may be joined to an adaptor plate 73 to form a refractor module assembly 90. The adaptor plate 73 defines surfaces 75 positioned to abut the shoulders 26*a*, 26*b* (or 27*a*, 27*b*) so that the adaptor plate 73 may be used in place direct substitution for a light guide assembly/lighting modules in the examples described above, as will be appreciated by a comparison of FIG. 15B to FIG. 6B. Tool-free assembly and disassembly of the refractor module assemblies is conducted as described above with respect to the light guide plate assembly.

Figure 15A:
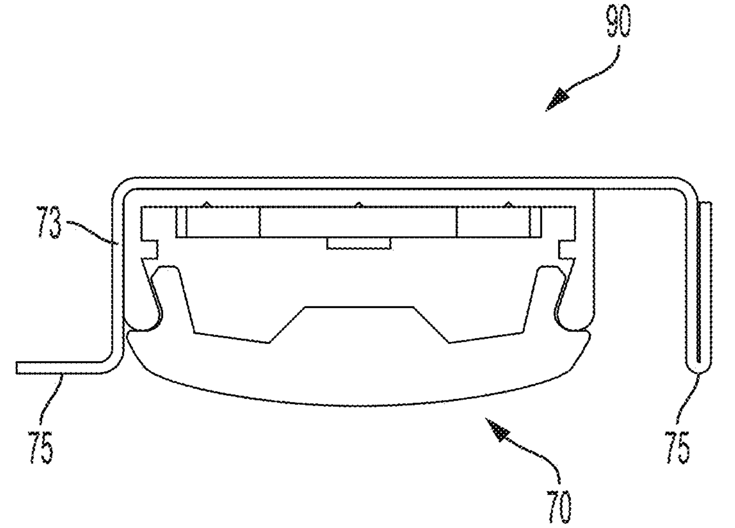
FIG. 15A is an end view of an exemplary refractor module assembly for use in a luminaire.
Figure 15B:
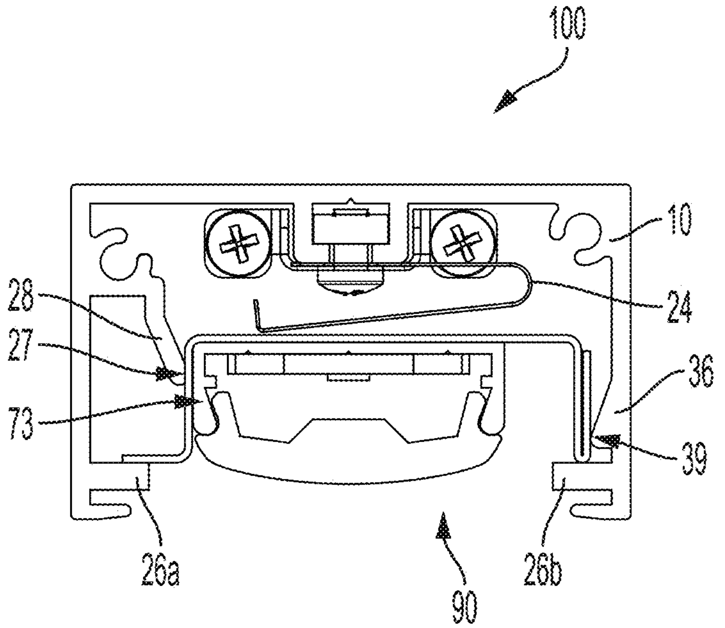
FIG. 15B is an end view of an exemplary luminaire in accordance with a seventh exemplary embodiment of the present invention, including the refractor module assembly of FIG. 15A.

In certain embodiments, such as those shown in FIG. 15B, the stop 28 may further define a second stop surface 27 that is positioned to engage a side portion of the adaptor plate 73 and cooperate with the retention surface 39 of the guide rib 36 while the adaptor plate/refractor module assembly 90 is in the operative position within the window, to help to retain the refractor module assembly on the housing 10 in a stable and secure fashion, e.g., in a friction fit by wedging the refractor module assembly between the second stop surface 27 and retention surface 39, as will be appreciated from FIGS. 6A and 15B.

Notably, any combination of one or more light guide assemblies/lighting modules, refractor modules, and refractor module assemblies may be used in a single luminaire, as illustrated by the examples below. More particularly, a refractor module may be used in substitution for a light guide assembly/lighting module in any of the embodiments shown in FIGS. 1-13, using the exact same housings 10.

Current edge lit luminaires are typically stand-alone fixtures or panels that are not easily serviceable. They typically do not have row capability, in that they cannot be interconnected end-to-end to form a continuous row of multiple interconnected housings, in modular fashion. Further, many typical stand-alone fixtures require a remote driver located outside the fixture, typically in/above a ceiling surface. A typical edge lit luminaire must be taken down and/or disassembled in a service facility to service it (e.g., change an LED module), and service of the remote driver requires someone to go up into/access space above the ceiling. Luminaires in accordance with the present invention allows for integral driver and remote driver versions that can be serviced in placed (mounted to the ceiling) without taking down the fixture. Further, the integral driver version has the driver inside the fixture housing, the luminaire is configured such that the integral driver can be accessed easily without having to take down the fixture or going up into/accessing spaced above the ceiling.

Accordingly, the present invention allows for easy tool-less access to the wiring compartment, access to service operative components, continuous row capability and allows one or more luminaires to be powered by an integral driver or remote driver used in conjunction with the linear LED gear tray. Further, embodiments of the present invention provide toolless luminaires having a toolless assembly feature permitting entry to the wiring compartment and other compartments by way of one or more interference fit components, and/or or non-mechanical fastener fit components, to engage with various aspects of the housing and/or other components of the luminaire.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A luminaire comprising:

a housing defining a compartment accessible via a window defined by the housing, said housing further defining a pair of opposed shoulders adjacent said window;

a lighting module dimensioned to be received and retained in said window in an interference fit with said shoulders, said lighting module comprising a light source; and a resilient member supported on said housing, said resilient member being positioned to abut said lighting module and be deflected by contact therewith during insertion of said lighting module through said window, and to at least partially resile to maintain said lighting module against said shoulders in an operative position on said housing, said resilient member comprising a leg positioned over and spanning a center of a width of said window, said leg extending at an acute angle relative to a plane of said window in position to abut and position said lighting module during insertion and removal of said lighting module relative to said window.

2. The luminaire of claim 1, wherein said housing defines a first wall joining a pair of opposed side walls, said first and pair of opposed side walls collectively defining said compartment, said pair of opposed side walls defining said window and said shoulders.

3. The luminaire of claim 1, further comprising:

at least one end cap matable to an end of said housing to at least partially define said compartment.

4. The luminaire of claim 1, wherein said shoulders are positioned to cause said lighting module to be maintained in a plane.

5. The luminaire of claim 1, wherein said resilient member comprises a discrete unitary body joined to said housing, and wherein said resilient member comprises a pair of legs defining an acute angle therebetween.

6. The luminaire of claim 1, wherein said lighting module comprises a light guide assembly, said light guide assembly comprising:

a light source module comprising:

a substrate;

an array of LEDs supported on said substrate; and a light guide plate comprising structures receiving light from said array of LEDs in a first direction, and redirecting said light outwardly in a second direction transverse to said first direction.

7. The luminaire of claim 6, wherein said housing further comprises a stop extending into said compartment and defining a stop surface positioned to abut said lighting module during insertion of said lighting module into said compartment to brace said lighting module at a position in which a first longitudinal edge of said light guide plate is aligned relative to at least one of said shoulders for movement into said operative position.

8. The luminaire of claim 7, wherein said light guide plate has a first longitudinal edge and a second longitudinal edge opposite said first longitudinal edge, and said reflector is configured to overlie only one of said first and second longitudinal edges.

9. The luminaire of claim 6, wherein said stop defines a secondary compartment at least partially separated from a remainder of said compartment by said stop, said secondary compartment being dimensioned to receive said light source module and retain said light source module in position to edge light said light guide plate when said light source module is in the operative position on said housing.

10. The luminaire of claim 6, wherein said light guide assembly further comprises:

a reflector plate dimensioned to overlie at least a part of a surface of said light guide plate to reflect light outwardly from the luminaire.

11. The luminaire of claim 10, wherein said housing further defines at least one opening dimensioned to receive a connector pin to align adjacent ends of multiple housings, and wherein a first end of said housing comprises a first connector, and wherein a second end of said housing comprises a second connector, and wherein a first connector of a first housing is matable with a second connector a second housing to mechanically interconnect said first and second housings.

12. The luminaire of claim 1, wherein said housing further defines a guide rib, said guide rib defining a cam surface positioned to cooperate with said resilient member to direct said lighting module laterally into the operative position.

13. The luminaire of claim 12, wherein said guide rib further defines a retention surface positioned to engage a side of said lighting module while it is in the operative position and to retain said lighting module by urging it again a portion of said luminaire.

14. The luminaire of claim 1, wherein said lighting module comprises a refractor module, said refractor module comprising:

a refractor housing;

an array of LEDs supported on said refractor housing; and a refractor element joined to said refractor housing and comprising structures positioned to distribute light emitted from said array of LEDs.

15. The luminaire of claim 14, wherein said refractor housing and said refractor element comprising complementary structures operable to releasably mate said refractor element to said refractor housing in one of an interference and a friction fit.

16. The luminaire of claim 14, further comprising a refractor module mounted on said housing opposite said compartment and said window.

17. The luminaire of claim 14, wherein said lighting module further comprises an adaptor plate joined to refractor module to form a refractor module assembly, said adaptor plate defining surfaces positioned to abut said pair of shoulders.

18. The luminaire of claim 14, wherein said housing further defines an outer pair of opposed shoulders adjacent said window, spaced from said pair of shoulders and positioned outwardly therefrom relative to said compartment, and wherein said luminaire further comprises a diffuser panel dimensioned to be received and retained in said window in an interference fit with said outer pair of opposed shoulders.

19. The luminaire of claim 1, further comprising:

a second instance of opposed shoulders and a second window adjacent thereto, said second instance of opposed shoulders being positioned on said housing opposite said compartment and said window;

a boss on said housing adjacent said second instance of opposed shoulders, said boss being positioned relative to said second opposed shoulders to receive a second instance of a light guide assembly and support it adjacent said shoulders in a second operative position on said housing.

20. The luminaire of claim 19, further comprising a refractor module mounted on said boss, said refractor module comprising:

a refractor housing;

an array of LEDs supported on said refractor housing; and a refractor element joined to said refractor housing and comprising structures positioned to distribute light emitted from said array of LEDs.

21. The luminaire of claim 19, wherein said housing further defines a second outer pair of opposed shoulders adjacent said second window, spaced from said second instance of opposed shoulders and positioned outwardly therefrom relative to said boss, and wherein said luminaire further comprises a second diffuser panel dimensioned to be received and retained in said second window in an interference fit with said second outer pair of opposed shoulders.

22. A luminaire comprising:

a housing having a first wall joining a pair of opposed side walls, said first and pair of opposed side walls defining a compartment therebetween accessible via a window defined by said housing, said housing further defining a pair of opposed shoulders adjacent said window;

a lighting module dimensioned to be received and retained in said window in an interference fit with said shoulders, said lighting module comprising a light source; and a resilient member supported on said housing, said resilient member comprising a fixed leg joined to said housing, and a free leg immediately adjacent and joined to said fixed leg to define an acute angle therebetween, said free leg being positioned to abut said lighting module and be deflected by contact therewith during insertion of said lighting module through said window, and to at least partially resile to maintain said lighting module against said shoulders in an operative position on said housing, said free leg being further positioned to cause tilting of said lighting module to facilitate ejection of said lighting module from said compartment as said second leg resiles while said lighting module is in a tilted position.

23. The luminaire of claim 22, wherein said resilient member comprises a discrete unitary body comprising said fixed leg and said free leg.

24. The luminaire of claim 22, wherein said lighting module comprises a light guide assembly, said light guide assembly comprising:

a light source module comprising:

a substrate;

an array of LEDs supported on said substrate; and a light guide plate comprising structures receiving light from said array of LEDs in a first direction, and redirecting said light outwardly in a second direction transverse to said first direction.

25. The luminaire of claim 24, wherein said housing further comprises a stop extending into said compartment and defining a stop surface positioned to abut said lighting module during insertion of said lighting module into said compartment to brace said lighting module at a position in which a first longitudinal edge of said light guide plate is aligned relative to at least one of said shoulders for movement into said operative position.

26. The luminaire of claim 25, wherein said housing further defines a guide rib, said guide rib defining a cam surface positioned to cooperate with said resilient member to direct said lighting module laterally into the operative position.

27. The luminaire of claim 26, wherein said guide rib further defines a retention surface positioned to engage a side of said lighting module while it is in the operative position and to retain said lighting module by urging it again a portion of said luminaire.

28. The luminaire of claim 22, wherein said lighting module comprises a refractor module, said refractor module comprising:

a refractor housing;

an array of LEDs supported on said refractor housing; and a refractor element joined to said refractor housing and comprising structures positioned to distribute light emitted from said array of LEDs.

29. The luminaire of claim 22, wherein said housing further defines an outer pair of opposed shoulders adjacent said window, spaced from said pair of shoulders and positioned outwardly therefrom relative to said compartment, and wherein said luminaire further comprises a diffuser panel dimensioned to be received and retained in said window in an interference fit with said outer pair of opposed shoulders.

30. The luminaire of claim 29, further comprising:

a second instance of opposed shoulders and a second window adjacent thereto, said second instance of opposed shoulders being positioned on said housing opposite said compartment and said window;

a boss on said housing adjacent said second instance of opposed shoulders, said boss being positioned relative to said second opposed shoulders to receive a second instance of a light guide assembly and support it adjacent said shoulders in a second operative position on said housing.

31. The luminaire of claim 30, further comprising a refractor module mounted on said boss, said refractor module comprising:

a refractor housing;

an array of LEDs supported on said refractor housing; and a refractor element joined to said refractor housing and comprising structures positioned to distribute light emitted from said array of LEDs.

32. The luminaire of claim 30, wherein said housing further defines a second outer pair of opposed shoulders adjacent said second window, spaced from said second instance of opposed shoulders and positioned outwardly therefrom relative to said boss, and wherein said luminaire further comprises a second diffuser panel dimensioned to be received and retained in said second window in an interference fit with said second outer pair of opposed shoulders.

33. A luminaire assembly comprising:

a housing comprising:

a first wall;

a pair of opposed side walls joined by said first wall;

said first and pair of opposed side walls defining a compartment therebetween accessible via a window defined by said housing;

a pair of opposed shoulders adjacent said window; and a stop extending into said compartment and defining a stop surface positioned to abut a lighting module during insertion of said lighting module into said compartment to brace said lighting module at a position in which said lighting module is aligned for movement into an operative position on said housing; and a resilient member supported on said housing, said resilient member having a first leg extending toward said stop, and a second leg positioned at an acute angle relative to said first leg, said second leg being positioned to abut said lighting module and be deflected by contact therewith during insertion of said lighting module through said window, and to at least partially resile to maintain said lighting module against said shoulders in an operative position on said housing, said second leg and said stop cooperating to cause tilting of said lighting module to facilitate ejection of said lighting module from said compartment as said second leg resiles while said lighting module is in a tilted position.

34. The luminaire assembly of claim 33, wherein said resilient member comprises a discrete unitary body joined to said housing.

35. The luminaire assembly of claim 34, said housing comprising:

a guide rib defining a cam surface positioned to cooperate with said resilient member to direct said lighting module laterally into the operative position.

36. The luminaire assembly of claim 35, wherein said guide rib further defines a retention surface positioned to engage a side of said lighting module while it is in the operative position and to retain said lighting module.

37. The luminaire assembly of claim 36, wherein said housing further defines an outer pair of opposed shoulders adjacent said window, spaced from said pair of shoulders and positioned outwardly therefrom relative to said compartment for receiving and retaining a diffuser panel in an interference fit with said outer pair of opposed shoulders.

38. The luminaire assembly of claim 33, further comprising:

a second instance of opposed shoulders and a second window adjacent thereto, said second instance of opposed shoulders being positioned on said housing opposite said compartment and said window;

a boss on said housing adjacent said second instance of opposed shoulders, said boss being positioned relative to said second opposed shoulders to receive a second instance of said lighting module and support it adjacent said shoulders in a second operative position on said housing.

39. The luminaire assembly of claim 38, wherein said housing further defines a second outer pair of opposed shoulders adjacent said second window, spaced from said second instance of opposed shoulders and positioned outwardly therefrom relative to said boss to receive a second diffuser panel dimensioned to be received and retained in said second window in an interference fit with said second outer pair of opposed shoulders.

* * * * *